(12) United States Patent
Mishio et al.

(10) Patent No.: US 9,979,899 B2
(45) Date of Patent: May 22, 2018

(54) IMAGE EFFECT PROCESSING SUPPORT APPARATUS, IMAGE EFFECT PROCESSING SUPPORT METHOD, AND MEDIUM FOR RECORDING IMAGE EFFECT PROCESSING SUPPORT PROGRAM

(71) Applicant: Olympus Corporation, Hachioji-shi, Tokyo (JP)

(72) Inventors: Yuki Mishio, Hino (JP); Yuiko Uemura, Hachioji (JP)

(73) Assignee: Olympus Corporation, Tokyo (JP)

( * ) Notice: Subject to any disclaimer, the term of this patent is extended or adjusted under 35 U.S.C. 154(b) by 72 days.

(21) Appl. No.: 15/097,042

(22) Filed: Apr. 12, 2016

(65) Prior Publication Data

US 2016/0366343 A1 Dec. 15, 2016

(30) Foreign Application Priority Data

Jun. 15, 2015 (JP) ................. 2015-120533

(51) Int. Cl.
*H04N 5/262* (2006.01)
*H04N 5/232* (2006.01)
*H04N 1/60* (2006.01)

(52) U.S. Cl.
CPC ....... *H04N 5/2621* (2013.01); *H04N 5/23229* (2013.01); *H04N 5/23245* (2013.01); *H04N 1/6011* (2013.01); *H04N 2201/0084* (2013.01)

(58) Field of Classification Search
CPC ............. H04N 5/23293; H04N 5/2621; H04N 2201/0084; H04N 5/232; H04N 5/2628; H04N 2101/00; H04N 5/23212; H04N 5/23219; H04N 5/23229; H04N 5/23245; H04N 1/6011
See application file for complete search history.

(56) References Cited

U.S. PATENT DOCUMENTS

| | | | | |
|---|---|---|---|---|
| 8,085,318 B2* | 12/2011 | Ciudad | .............. | H04N 1/00286 348/239 |
| 8,643,760 B2* | 2/2014 | Wang | ................... | H04N 5/2621 345/520 |
| 2014/0085511 A1* | 3/2014 | Toida | ................... | H04N 5/2625 348/239 |
| 2014/0347386 A1* | 11/2014 | Hughes | ................... | G06T 11/60 345/619 |
| 2015/0208001 A1* | 7/2015 | Kaneko | ................... | G06T 5/002 348/239 |

FOREIGN PATENT DOCUMENTS

JP 2007-019617 1/2007

* cited by examiner

*Primary Examiner* — Luong T Nguyen
(74) *Attorney, Agent, or Firm* — John C. Pokotylo; Pokotylo Patent Services

(57) ABSTRACT

An image effect processing support apparatus includes: an image effect processing section that performs a specific image effect processing on an image; a confirmation region determination section that determines an effect of the specific image effect processing for each part of the image, and based on a result of the determination, determines and sets a confirmation region for confirming the effect of the image effect processing; and a display control section that displays an effect indication that shows the effect of the image effect processing in the confirmation region on a display section, to thereby enable an effect of a filter effect processing to be easily confirmed.

17 Claims, 11 Drawing Sheets

IMAGE EFFECT PROCESSING SUPPORT APPARATUS, IMAGE EFFECT PROCESSING SUPPORT METHOD, AND MEDIUM FOR RECORDING IMAGE EFFECT PROCESSING SUPPORT PROGRAM

This application claims the benefit of Japanese Application No. 2015-120533 filed in Japan on Jun. 15, 2015, the contents of which are incorporated by this reference.

BACKGROUND OF THE INVENTION

1. Field of the Invention

The present invention relates to an image effect processing support apparatus, an image effect processing support method, and a medium for recording an image effect processing support program, which are preferable for a photographing device capable of performing photographing in which various kinds of special effect processing (filter effect processing) are added to images.

2. Description of Related Art

In recent years, mobile devices with photographing function (photographing devices) such as digital cameras have been widely used. Some of such types of photographing devices include a display section and a function for displaying a photographed image on the display section. Furthermore, some of the photographing devices enable a menu screen to be displayed on a display section to facilitate an operation of the photographing devices.

In addition, photographing devices having a photographing mode in which predetermined filter effect processing is applied to a picked-up image have been developed. For example, by applying predetermined filter effect processing to a picked-up image, various kinds of image processing are possible, that is, a photographer can add his or her preference to the object, or clearly express the preference.

Incidentally, in a silver-halide photograph, coarseness of image quality of the photograph varies depending on the characteristics and the like of silver grains of a silver-halide film to be used, and impression of the roughness on the surface of the photograph (hereinafter, referred to as graininess) becomes strong in some cases. In general, the larger the size of silver grains, the more the graininess is noticeable. The graininess has an advantage in representation such as improvement in presence or texture of an object, and is sometimes effective particularly in monochrome images. Also in digital cameras, the above-described graininess can be added to a picked-up image by performing filter effect processing, which enables the image effect to be improved.

For example, Japanese Patent Application Laid-Open Publication No. 2007-19617 discloses a technique for generating image data from which a photograph that is substantially the same as the one obtained by a silver-halide camera can be obtained, by arbitrarily setting photographing conditions and developing conditions of a silver-halide camera with a photographing condition setting dial. The apparatus disclosed in the Japanese Patent Application Laid-Open Publication No. 2007-19617 is configured to be able to set a granular noise imparting rate with a noise control dial, to superimpose granular data expressing graininess of a photograph obtained by photographing with a silver-halide camera on an image data, and obtain an image based on the image data on which the granular data is superimposed.

SUMMARY OF THE INVENTION

An image effect processing support apparatus according to the present invention includes: an image effect processing section that performs a specific image effect processing on an image; a confirmation region determination section that determines easiness of confirmation such as visibility of the effect of the specific image effect processing for each part of the image, and based on a result of the determination, determines and sets a confirmation region for confirming the effect of the image effect processing; and a display control section that displays an effect indication that shows the effect of the image effect processing in the confirmation region on a display section.

Further, an image effect processing support method according to the present invention includes: an image effect processing step in which a specific image effect processing is performed on an image; a confirmation region determining step in which an effect of the specific image effect processing is determined for each part of the image, and based on a result of the determination, a confirmation region for confirming the effect of the image effect processing is determined and set; and a displaying step in which an effect indication that shows the effect of the image effect processing in the confirmation region is displayed on a display section.

Furthermore, a medium for recording an image effect processing support program according to the present invention, which records an image effect processing support program for causing a computer to execute: an image effect processing step in which a specific image effect processing is performed on an image; a confirmation region determining step in which an effect of the specific image effect processing is determined for each part of the image, and based on a result of the determination, a confirmation region for confirming the effect of the image effect processing is determined and set; and a displaying step in which an effect indication that shows the effect of the image effect processing in the confirmation region is displayed on a display section.

The above and other objects, features and advantages of the invention will become more clearly understood from the following description referring to the accompanying drawings.

DETAILED DESCRIPTION OF PREFERRED EMBODIMENT

Hereinafter, an embodiment of the present invention will be described in detail with reference to drawings.

Figure 1:
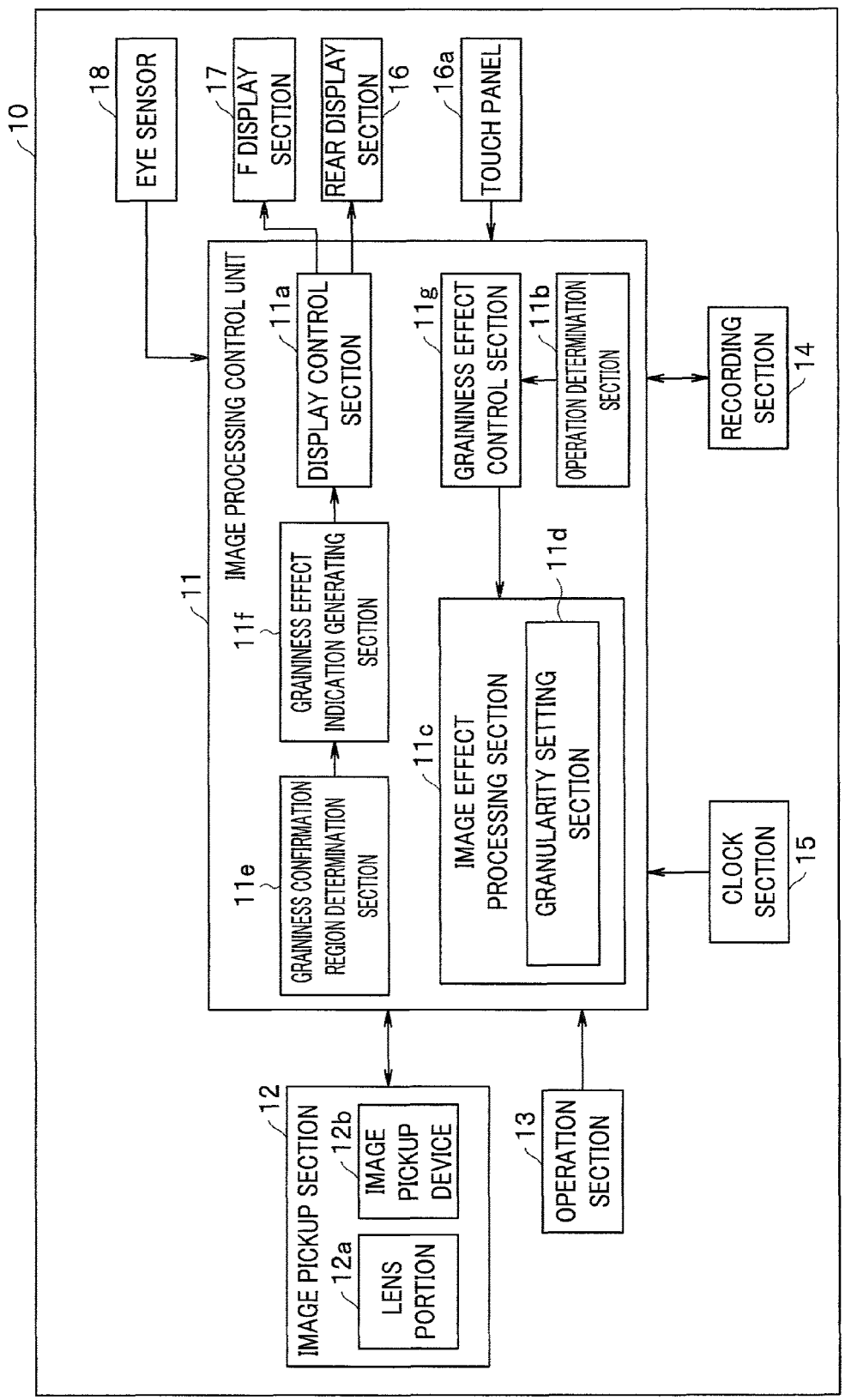
FIG. 1 a block diagram illustrating a circuit configuration of a photographing device in which an image effect processing support apparatus according to one embodiment of the present invention is incorporated.
Figure 2:
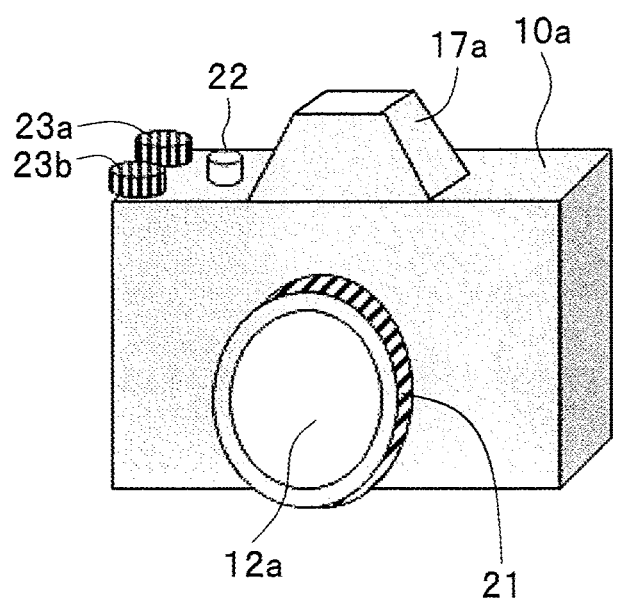
FIG. 2 is an illustration diagram showing one example of an external appearance of the photographing device in FIG. 1.

FIG. 1 a block diagram illustrating a circuit configuration of a photographing device in which an image effect processing support apparatus according to one embodiment of the present invention is incorporated. Further, FIG. 2 is an illustration diagram showing one example of an external appearance of the photographing device in FIG. 1.

According to the present embodiment, in a through image display in a special effect image processing photographing (filter) mode (hereinafter, referred to as granular photographing mode) in which graininess is imparted to a picked-up image at the time of image pickup, a region where the effect of graininess can be easily confirmed such as a part in which the graininess in the picked-up image is conspicuous is set as a graininess confirmation region, to enable a user to confirm the effect of graininess in the graininess confirmation region with ease, high efficiency, high visibility, and rapidity. In addition, the present embodiment allows a user to change the degree of enhancement or reduction in the graininess (hereinafter, referred to as granularity) with an intuitive operation, and to confirm the effect of the graininess after the change of granularity, thereby enabling the user to set effective graininess.

The granular photographing mode is a mode for adding, for example, a predetermined signal such as random noise (hereinafter referred to as granular noise) or a grained pattern such as a fogged glass (hereinafter, referred to as granular pattern) to a picked-up image, and obtaining graininess same as the graininess according to the characteristics of silver grains in a silver-halide photograph. In a silver-halide photograph, granularity corresponding to the size or the like of the silver grains can be obtained. Therefore, the graininess differs depending on the sensitivity of the selected film. Some photographers represent their unique style with the graininess. According to such representation, in the granular photographing mode, the granularity is changed by changing the amplitude and frequency of the granular noise, and the amplitude (contrast) and spatial frequency of the granular pattern. For example, in general, the larger the amplitudes and cycles of the granular noise and granular pattern, the larger the granularity becomes. With the use of such characteristics, distinctive representation can be imparted to a photographed image.

In addition, description will be made on an example in which the granular noise or the granular pattern is added to the picked-up image to change the impression of roughness on the image surface. In order to change the texture of the image, not only dots but also a predetermined design or the like may be added, or a pattern including such a design may be added to the picked-up image. In the description below, an example in which the granular noise is added to the picked-up image will be described. However, the present invention can be similarly applied also to the case where a granular pattern or a pattern of a predetermined design is added to the picked-up image.

Even in a case where the same granular noise is added to the entirety of the picked-up image, the graininess to be obtained is not equal on the entirety of the screen. For example, it is supposed that random noise is evenly added as granular noise to the image signal. Note that the level and the like of the random noise randomly change, but it is supposed that the average level of the random noise is constant.

Figure 3:
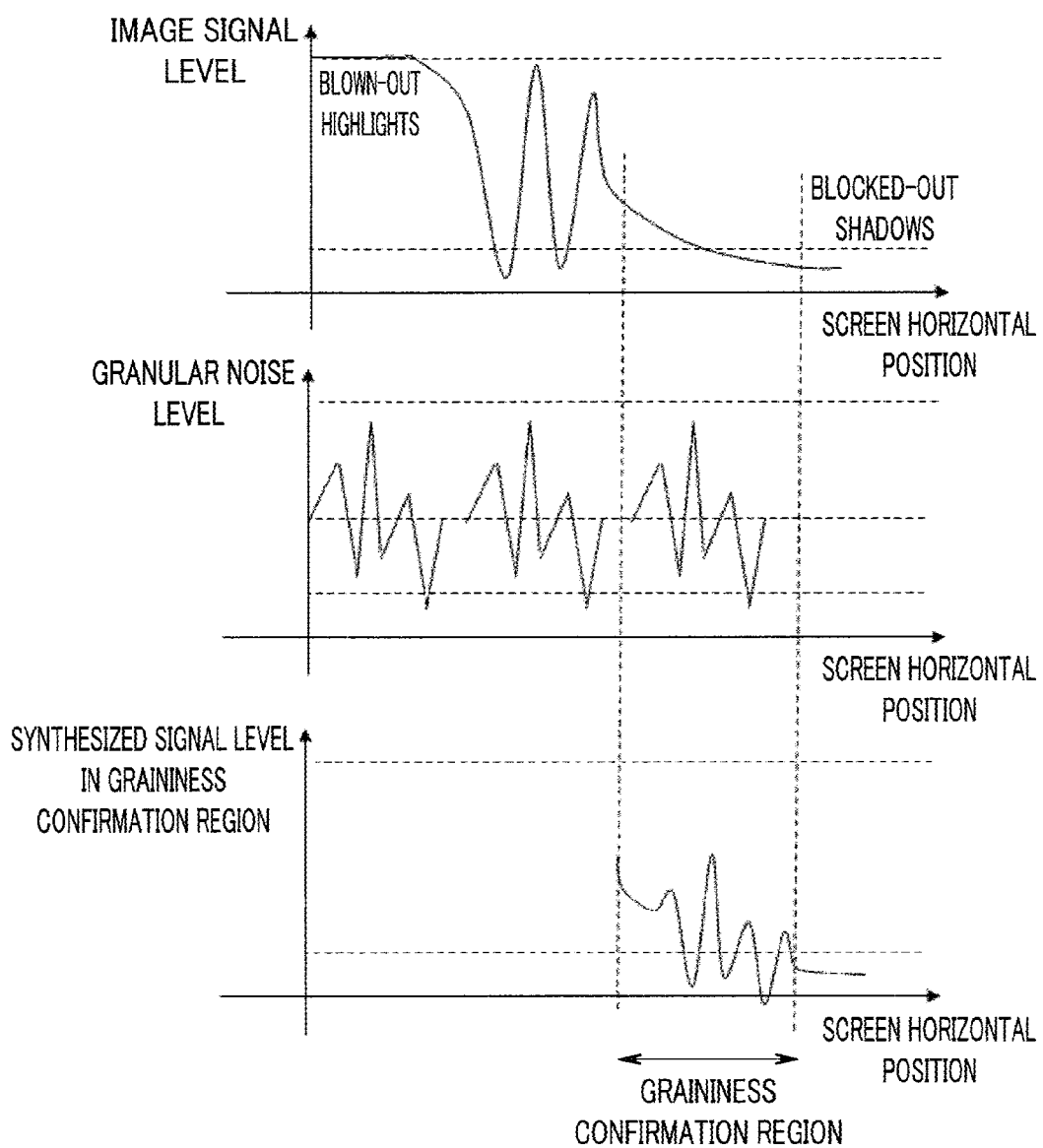
FIG. 3 is an illustration diagram for illustrating an effect of graininess generated by granular noise, with screen horizontal positions as horizontal axes and levels as vertical axes.

FIG. 3 is an illustration diagram for illustrating the effect of graininess generated by granular noise, with screen horizontal positions as horizontal axes and the levels as vertical axes. The upper section of FIG. 3 shows a picked-up image to which the graininess is imparted, the middle section of FIG. 3 shows the random noise as the granular noise, and the lower section of FIG. 3 shows an image signal in the graininess confirmation region in the picked-up image to which the granular noise is added (synthesized image).

In the picked-up image shown in the upper section of FIG. 3, the level of the image signal is high and blown-out highlights occur on the left end side of the screen, there is a part including a relatively fine picture pattern at the center of the screen, there is a part where the level of the image signal changes gradually from the part including the picture pattern toward the right side of the screen, and the level of the image signal is low and blocked-up shadows occur on the right end of the screen. In the granular photographing mode, the granular noise shown in the middle section in FIG. 3 is added to the picked-up image shown in the upper section in FIG. 3.

The state of the blown-out highlights does not change even if the granular noise is added to the part where the blown-out highlights occur. Therefore, the graininess cannot be obtained from the part. In addition, the state of the blocked-up shadows does not change even if the granular noise is added to the part where the blocked-up shadows occur. Therefore, the graininess cannot be obtained also from the part. Although the part including the fine picture pattern is affected by the granular noise, it is difficult to confirm the change of the image caused by the granular noise in some picture patterns in the image. That is, the effect of the granular noise is relatively small in the part including the fine picture pattern.

On the other hand, in the part where blown-out highlights and blocked-up shadows do not exist and the level of the image signal is constant or changes gradually, the granular noise is added to the signal whose level changes gradually, as shown in the lower section in FIG. 3. As a result, the visibility of the granular noise is high, the granular noise is noticeable on the screen, and the effect of the graininess is relatively high. Thus, even when the granular noise is evenly added to the image, the effect of the graininess is not even due to the characteristics of each part of the image. In the part where the effect of the graininess is small, it is not easy to confirm the effect of the graininess, which may result in a failure in the effective setting by the user. Therefore, in the present embodiment, a graininess confirmation region where the graininess is conspicuous is determined from the image, for example, and an indication (hereinafter, graininess effect indication) showing the effect of the graininess in the graininess confirmation region is displayed.

Note that, as described later, a region designated by the user in the image, for confirming the effect of the graininess (hereinafter, referred to as graininess confirmation designated region) may be set as the graininess confirmation region, and the graininess effect indication may be displayed.

In FIG. 1, a photographing device 10 includes on the front face thereof an image pickup section 12. The image pickup section 12 includes an image pickup device 12b configured by an image pickup device such as CCD, CMOS sensor, or the like. In addition, the image pickup section 12 includes a lens portion 12a that guides an object optical image to the image pickup device 12b. The lens portion 12a includes lenses for zooming or focusing, and the like, not shown, and these lenses are configured to be driven and controlled by an image processing control unit 11. The image pickup section 12 is configured such that the focus position, the zoom position, the diaphragm, and the like are controlled by the image processing control unit 11. The image pickup device 12b photoelectrically converts the object optical image received from the lens portion 12a, to obtain a photographed image.

For example, the image processing control unit 11 may be configured by a processor such as CPU, not shown, and configured to perform camera control according to the program stored in the memory. The image processing control unit 11 outputs a driving signal for driving the image pickup device to the image pickup section 12, to control the shutter speed, the exposure time, and the like, and reads out the photographed image from the image pickup section 12. The image processing control unit 11 performs predetermined signal processing, for example, color adjusting processing, matrix transformation processing, noise removal processing, and other various kinds of signal processing on the read photographed image.

The respective circuits of the photographing device 10 are housed in a housing 10a shown in FIG. 2. On the front face side of the housing 10a, the lens portion 12a is arranged. Around the lens portion 12a, a ring operation portion 21 is disposed. In addition, a shutter button 22 and two dial operation portions 23a, 23b are disposed on the top face of the housing 10a.

In FIG. 1, an operation section 13 includes the ring operation portion 21, the shutter button 22, the dial operation portions 23a, 23b, and function buttons, various kinds of switches such as a photographing mode setting switch, and the like which are not shown. An operation determination section 11b in the image processing control unit 11 receives an operation signal based on the user operation from the operation section 13, to determine the contents of the user operation. The image processing control unit 11 controls the respective sections based on a result of the operation determination.

The image processing control unit 11 is capable of performing processing related to recording and reproducing of a picked-up image. For example, the image processing control unit 11 performs compression processing on the photographed image subjected to the signal processing, to send the compressed image to a recording section 14 to cause the recording section to record the compressed image. As the recording section 14, a card interface can be employed, for example, and the recording section 14 can record the image information, voice information, etc., in a recording medium such as a memory card.

A display control section 11a in the image processing control unit 11 executes various kinds of processing related to display. The display control section 11a is capable of sending the photographed image subjected to the signal processing to a rear display section 16 and a finder display section (F display section) 17. Each of the display sections 16, 17 includes a display screen such as LCD and displays the image received from the display control section 11a. In addition, the display control section 11a also enables various kinds of menus to be displayed on the display screen of each of the display sections 16, 17.

The image processing control unit 11 is capable of reading out the picked-up image recorded in the recording section 14, to perform expansion processing on the read-out picked-up image. The display control section 11a sends the picked-up image subjected to the expansion processing to the display sections 16, 17, to thereby enable the recorded image to be reproduced.

The rear display section 16 has a display screen 16b for displaying a picked-up image, as described later. In addition, the display screen 16b includes thereon a touch panel 16a. The touch panel 16a is capable of generating an operation signal corresponding to a position on the display screen 16b pointed by the user with a finger. The operation signal is supplied to the image processing control unit 11. When the user touches or slides the display screen 16b, the operation determination section 11b in the image processing control unit 11 is capable of detecting various operations, for example, the position touched by the user, the operation for closing and then spreading the fingers (pinch operation), the sliding operation, the position reached by the sliding operation, the sliding direction, a time period during which the user touches the display screen, etc. Based on the detection, the image processing control unit 11 is capable of executing processing corresponding to the touch panel operation by the user.

Note that the rear display section 16 is disposed so as to cover substantially the entire region of the rear face of the housing 10a of the photographing device 10, for example, and the photographer is capable of confirming the through image displayed on the display screen 16b of the rear display section 16 at the time of photographing, and also performing photographing operation while confirming the through image.

On the other hand, the F display section 17 is housed in a finder portion 17a provided on the top face of the housing 10a. An eye sensor 18 is provided in the vicinity of the finder portion 17a, and the eye sensor 18 detects that the user brings his or her eye close to the finder portion 17a, to output the detection result to the image processing control unit 11. The display control section 11a may switch the output destination of the image between the rear display section 16 and the F display section 17 depending on the detection result of the eye sensor 18.

The image processing control unit 11 is provided with an image effect processing section 11c. The image effect processing section 11c is configured to be able to perform predetermined image effect processing on the picked-up image. The image processing control unit 11 not only sends the picked-up image subjected to the image effect processing to the recording section 14 to cause the image to be recorded in the recording section, but also sends the picked-up image subjected to the image effect processing to the display control section 11a as a through image to cause the image to be displayed.

The image effect processing section 11c is provided with a granularity setting section 11d, and the granularity setting section 11d is capable of setting the granularity in the granular photographing mode. For example, the granularity setting section 11d sets the amplitude and cycle of the granular noise to be added to the picked-up image, to thereby change the size and density of the dots according to the gradation of the surface of the image. When the setting by the granularity setting section 11d is changed in a certain region in the image, the graininess in the certain region is enhanced or reduced.

In the present embodiment, a graininess confirmation region determination section 11e and a graininess effect indication generating section 11f are provided for confirming whether or not desired graininess can be obtained. The graininess confirmation region determination section 11e, which is a confirmation region determination section, is capable of determining the graininess confirmation region based on at least one of image analysis processing on the picked-up image from the image pickup section 12, image analysis processing on the picked-up image (synthesized image) in which the granular noise is synthesized by the image effect processing section 11c, and the image analysis processing on the two picked-up images before and after the synthesis of the granular noise.

For example, the graininess confirmation region determination section 11e may determine the graininess confirmation region by calculating the size of the black dots which constitute the image and the number of the black dots per unit area, or based on the contrast of the respective parts of the image.

For example, with regard to the picked-up image before the synthesis, the graininess confirmation region determination section 11e may determine, as the graininess confirmation region, a region where the exposure level is in a predetermined range and the contrast is smaller than a predetermined value. As such a region, an image part of a predetermined gray level where the shading (gradation) changes gradually can be considered, for example. When the sky, a white wall, and the like are included in the photographing range, for example, the image parts of the sky, etc., are sometimes determined as the graininess confirmation region. In addition, in some cases, the advantage in representation which is to be provided by imparting the graininess is greater in the region where shading changes in some degree than in the region where the change in shading is extremely small. Therefore, the degree of change in shading may be included as a determination condition for determining the graininess confirmation region.

In addition, with regard to the picked-up image after the synthesis, for example, the graininess confirmation region determination section 11e may determine, as the graininess confirmation region, a region where the exposure level is in a range in which the visibility is high and the number of the contrast peaks is larger than a predetermined threshold.

Furthermore, the graininess confirmation region determination section 11e may determine the graininess confirmation region by using the two picked-up images before and after the synthesis. For example, the graininess confirmation region determination section 11e may determine, as the graininess confirmation region, the region where the difference or ratio of the number of the contrast peaks in a predetermined amplitude range is larger than a predetermined threshold between the two images. It is considered that the contrast is sufficiently small in the region of blown-out highlights and the region of blocked-up shadows, and in the region where the exposure level is at a level at which visibility is excellent and fine picture patterns are included, the difference or ratio of the number of contrast peaks is relatively small between the images before and after the synthesis. In the region where the difference or ratio of the number of the contrast peaks in the predetermined amplitude range is larger than a predetermined threshold, the number of noticeable dots per unit area is sufficiently large in the image after the synthesis, and it is considered that conspicuous graininess can be obtained in the region.

In addition, for example, even in a region where the exposure level is in the predetermined range and the change of the shading is in a predetermined range, if the area of the region is relatively small, it is hard to obtain effective graininess. Therefore, the graininess confirmation region determination section 11e may add a region having a predetermined area or more as a determination condition for determining the graininess confirmation region.

Figure 4:
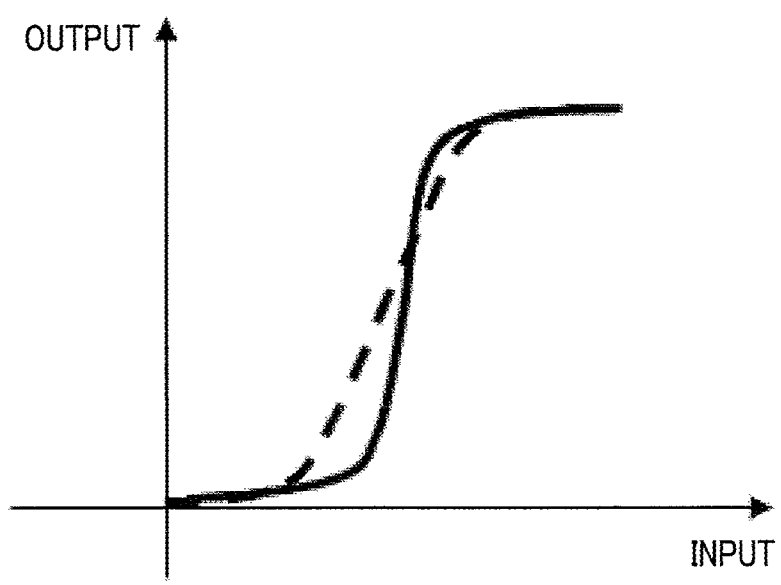
FIG. 4 is a graph illustrating γ correction, with a signal level of an input image as a horizontal axis and a signal level of an output image as a vertical axis.

Furthermore, a γ-correction value may be added as the determination condition for determining the graininess confirmation region. FIG. 4 is a graph illustrating the γ correction, with a signal level of an input image as a horizontal axis and a signal level of an output image as a vertical axis. The dashed line in FIG. 4 shows the γ-correction feature at the normal time, and the solid line shows the γ-correction feature in the granular photographing mode. At the normal time, the image processing control unit 11 compresses a predetermined white level range and a predetermined black level range to improve the contrast of the image part in which the exposure level is in an appropriate range, as shown by the dashed line in FIG. 4. However, at the time of image effect processing for imparting graininess effect, the image processing control unit 11 increases the white and black level ranges to be compressed, as shown by the solid line in FIG. 4. Therefore, even if the granular noise is added, the graininess is hardly noticeable in these compressed regions. Accordingly, the graininess confirmation region determination section 11e may set, as the graininess confirmation region, the image part in which the gradient of the γ-correction value is large and the exposure level is in the middle range.

The graininess confirmation region obtained by the above-described determination is a region where the conspicuous graininess can be obtained based on the features of the picked-up image. However, there is a case where the user would like to confirm the graininess in a region to which the user desires to add the graininess, for example, a part of the face of a person. The graininess confirmation region determination section 11e may set, as the graininess confirmation region, the region where the exposure level is in a predetermined range and the contrast is low at the auto focus point (AF point). In addition, the graininess confirmation region determination section 11e may detect the face of the person, to set the part of the face as the graininess confirmation region, or may set the region at the center of the image as the graininess confirmation region, for example. Furthermore, the graininess confirmation region determination section 11e may set an arbitrary region in the image, which is designated by the touching operation or the like by the user (graininess confirmation designated region), as the graininess confirmation region.

The graininess confirmation region determination section 11e sets the one or a plurality of regions obtained by the above-described determination as the graininess confirmation region. Information on the graininess confirmation region set by the graininess confirmation region determination section 11e is sent to the graininess effect indication generating section 11f. The graininess effect indication generating section 11f generates indication showing the graininess in the graininess confirmation region. For example, the graininess effect indication generating section 11f may set an image having a sufficient area, which includes dots having the size and density same as those in the graininess confirmation region, as the image used for the graininess effect indication. The graininess effect indication generating section 11f may generate the graininess effect indication by using an actual image of the graininess confirmation region, or may generate the graininess effect indication by using an image having a pattern which schematically shows the graininess. The graininess effect indication generating section 11f sends the generated graininess effect indication to the display control section 11a. The display control section 11a is configured to enable the graininess effect indication, which corresponds to the graininess in the graininess confirmation region, to be displayed on the through image displayed on each of the display sections 16, 17.

In addition, in the present embodiment, the graininess effect indication generating section 11f is configured to be able to generate an image in which the graininess same as that in the graininess effect indication corresponding to the graininess in the graininess confirmation region can be obtained (hereinafter, referred to as graininess setting image), an image in which graininess coarser than that in the graininess effect indication can be obtained (hereinafter, just referred to as coarse image), and an image in which graininess finer than that in the graininess effect indication can be obtained (hereinafter, just referred to as fine image). The graininess effect indication generating section 11f sends these generated graininess setting image, coarse image and fine image to the display control section 11a.

The display control section 11a generates indication for adjusting the graininess (hereinafter, referred to as granularity adjusting indication) based on the images sent from the graininess effect indication generating section 11f, to cause the generated indication to be displayed on the display sections 16, 17. The granularity adjusting indication is capable of showing the graininess setting image indicating the present graininess corresponding to the graininess in the graininess confirmation region, and the coarse image and fine image which are obtained when the granularity of the graininess effect indication is changed. The user views the granularity adjusting indication, to thereby be able to previously confirm, before the adjustment of the granularity, what degree of graininess is obtained by granularity adjusting.

In the present embodiment, the granularity can be adjusted with the dial operation portions 23a, 23b, etc., for example. In this case, the graininess effect indication generating section 11f allows the operation direction of the dial operation portions 23a 23b to correspond to the display direction of the plurality of images included in the granularity adjusting indication, each of the plurality of images having different graininess. This enables the user to specify the granularity with intuitive operation. For example, if the granularity adjusting indication in which the coarse image, the graininess setting image and the fine image are aligned linearly in the screen horizontal direction is employed, the operation direction of the dial operation portions 23a, 23b and the adjusting direction of the granularity can be made to correspond to each other, which enables the intuitive operation.

The granularity adjusting operation performed by the user is determined by the operation determination section 11b. The operation determination section 11b sends an operation signal based on the adjusting operation by the user to the graininess effect control section 11g. The graininess effect control section 11g controls the granularity setting section 11d so as to set the granularity corresponding to the granularity adjusting operation performed by the user. The granularity setting section 11d is controlled by the graininess effect control section 11g to change the granularity. Note that, when the granularity adjusting operation is performed by the user, the graininess effect indication generating section 11f updates the graininess effect indication, and the graininess effect indication and granularity adjusting indication after the adjustment are displayed on the display sections 16, 17.

Figure 5:
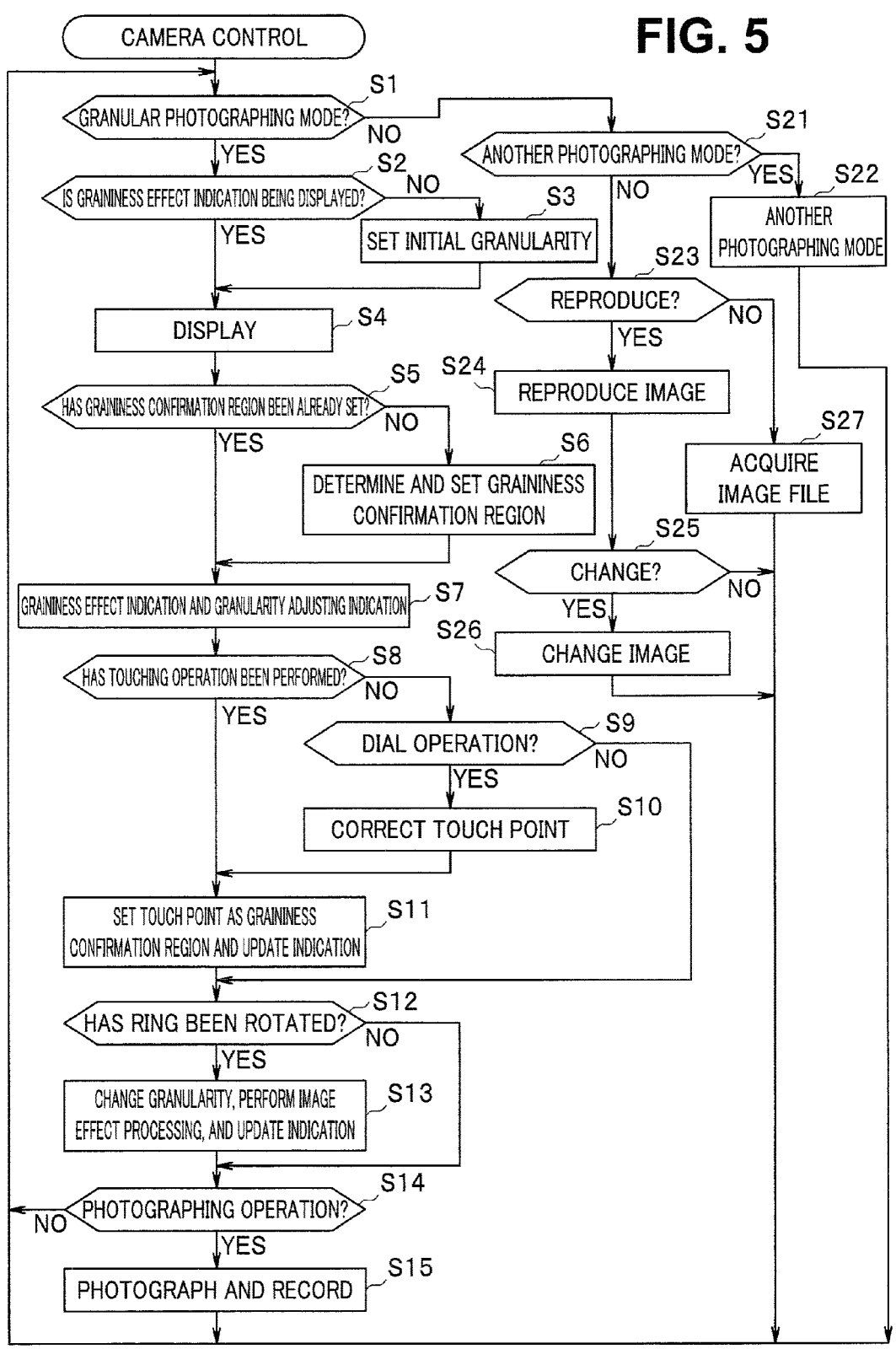
FIG. 5 is a flowchart for explaining an operation in the embodiment.
Figure 6:
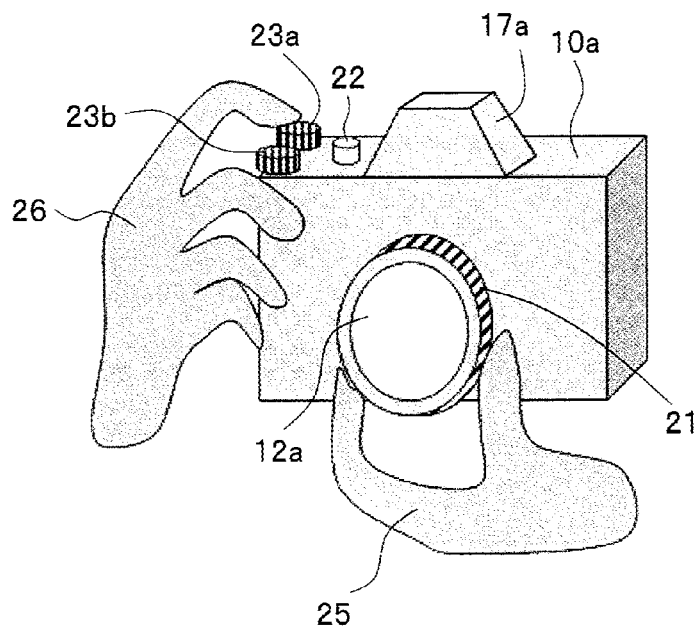
FIG. 6 is an illustration diagram for illustrating a situation of photographing.

Next, the operation in the embodiment thus configured will be described with reference to FIGS. 5 to 10. FIG. 5 is a flowchart for explaining the operation in the embodiment. FIG. 5 shows a camera control. FIG. 6 is an illustration diagram for illustrating a situation of photographing.

When the power source of the photographing device 10 is turned on, the image processing control unit 11 determines whether or not the granular photographing mode is instructed in step S1 in FIG. 5. When the granular photographing mode is not instructed, the image processing control unit 11 determines whether or not another photographing mode is specified in step S21. If the other photographing mode is specified, the image processing control unit 11 causes the processing procedure to move to step S22, and executes the specified photographing mode. If the reproducing mode is specified, the image processing control unit 11 causes the processing procedure to move from step S23 to step S24, and reproduces the specified image. When determining that change of the reproduced image is instructed in step S25, the image processing control unit 11 changes the image, to reproduce the changed image. Furthermore, when the reproducing mode is not instructed in the step S23, the image processing control unit 11 acquires an image file in step S27.

As shown in FIG. 6, the user pinches the part of the ring operation portion 21 with the fingers of the left hand 25, for example, and holds the lens portion 12a toward an object while supporting the housing 10a with the right and left hands 25, 26. When the granular photographing mode is instructed, the image processing control unit 11 causes the image pickup section 12 to pick up the image of the object, and in step S2, determines whether or not the graininess effect indication is being displayed. Shortly after the start of the granular photographing mode, the filter effect processing for imparting the graininess to the picked-up image is not performed, and the graininess effect indication is not displayed. Therefore, the image processing control unit 11 causes the granularity setting section 11d to set initial granularity in step S3. According to such operation, the image effect processing section 11c performs the image effect processing for obtaining graininess on the picked-up image with the initial granularity. In step S4, the image processing control unit 11 displays a through image based on the detection result from the eye sensor 18. That is, when the detection result from the eye sensor 18 indicates that the user's eye is in the finder portion 17a, the image processing control unit 11 causes the through image to be displayed on the F display portion 17, and when the detection results indicates otherwise, the image processing control unit 11 causes the through image to be displayed on the rear display section 16.

In the next step S5, the image processing control unit 11 determines whether or not the graininess confirmation region has been already set. When the graininess confirmation region is not set, the graininess confirmation region determination section 11e in the image processing control unit 11 determines and sets the graininess confirmation region in step S6.

Figure 7:
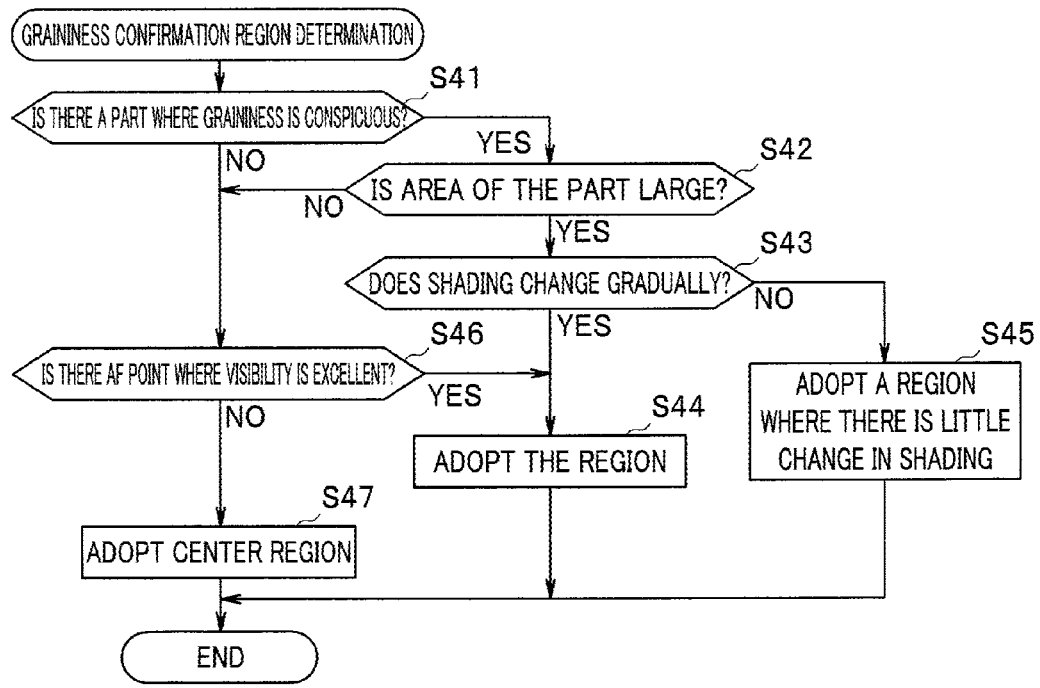
FIG. 7 is a flowchart showing one example of a setting flow of a graininess confirmation region in step S6 in FIG. 5.

FIG. 7 is a flowchart showing one example of a setting flow of the graininess confirmation region in step S6 in FIG. 5.

The graininess confirmation region determination section 11e determines whether or not a region where the graininess is conspicuous exists in the picked-up image in step S41. As described above, the graininess confirmation region determination section 11e may set the region where the exposure level is in a predetermined range and the contrast is relatively low, as the region where the graininess is conspicuous, for example. Note that such a part is changed by the exposure adjustment or focusing, and the result of such operations may be taken into consideration. The part where the graininess has been changed as a result of above-described adjustment may be determined as the "part where the graininess is conspicuous". Specifically, the determination is made based on presence or absence of rise and fall of signal level in the pattern as shown in the middle section in FIG. 3. The determination may be made not based on the rise and fall pattern of the signal level but based on the number of whitish granular patterns. When such a region where the graininess is conspicuous exists, the graininess confirmation region determination section 11e determines whether or not the area of the region is larger than the predetermined threshold in the next step S42. Determination on whether the area of the region is larger than the predetermined threshold is made in view of the visibility, notability of the effect, and an intention for boldly adding the effect. However, the area is not necessarily larger than the predetermined threshold. When the area of the region is larger than the threshold, the graininess confirmation region determination section 11e determines whether or not the region includes a part where the shading changes gradually (step S43). When the region includes the part where the shading changes gradually, the graininess confirmation region determination section 11e sets the part as the graininess confirmation region (step S44). When the region does not include the part where the shading changes gradually, the graininess confirmation region determination section 11e sets a region where there is little change in the shading among the regions detected in the step S41, as the graininess confirmation region (step S45). Depending on the intention of taking the photograph, there is a case where the photographer desires to add the effect only to a certain region. Therefore, the graininess confirmation region is not limited to the region where there is little change in the shading. That is, the steps in the determination here may be sort out or the order of the steps may be changed depending on a situation in which the picked-up image is used or a concept of design of the device.

When the area of the region where the graininess is determined to be conspicuous is relatively small, the confirmation of the graininess is not easy. Therefore, when the part where the graininess is conspicuous does not exist or even if the part where the graininess is conspicuous exists, when the area of the part is relatively small, the graininess confirmation region determination section 11e causes the processing procedure to move to step S46, and determines whether or not the AF point where the visibility is excellent exists. When the AF point where visibility is excellent exists, the graininess confirmation region determination section 11e sets the AF point as the graininess confirmation region (step S44). When the AF point where visibility is excellent does not exist, the graininess confirmation region determination section 11e sets the center region of the image as the graininess confirmation region in step S47.

Note that FIG. 7 shows one example, and the graininess confirmation region may be set according to another setting flow. For example, the condition of the AF point where visibility is excellent may be prioritized, so even if the part where the graininess is conspicuous exists, the AF point where visibility is excellent may be set as the graininess confirmation region. Alternatively, the region of the face of a person may be set as the graininess confirmation region, for example.

The determination result obtained by the graininess confirmation region determination section 11e is sent to the graininess effect indication generating section 11f. The graininess effect indication generating section 11f generates the graininess effect indication corresponding to the graininess in the set graininess confirmation region and the granularity adjusting indication in the step S7. That is, the graininess effect indication generating section 11f generates, as the graininess effect indication, an image having a sufficient area and including dots having the same size and density as those in the graininess confirmation region. In addition, the graininess effect indication generating section 11f generates the graininess setting image in which the graininess same as that in the generated graininess effect indication can be obtained, the coarse image, and the fine image, to send the generated images to the display control section 11a. The display control section 11a causes the graininess effect indication and the granularity adjusting indication to be displayed on the display screen of one of the display sections 16 and 17, based on the output from the graininess effect indication generating section 11f.

Figure 8:
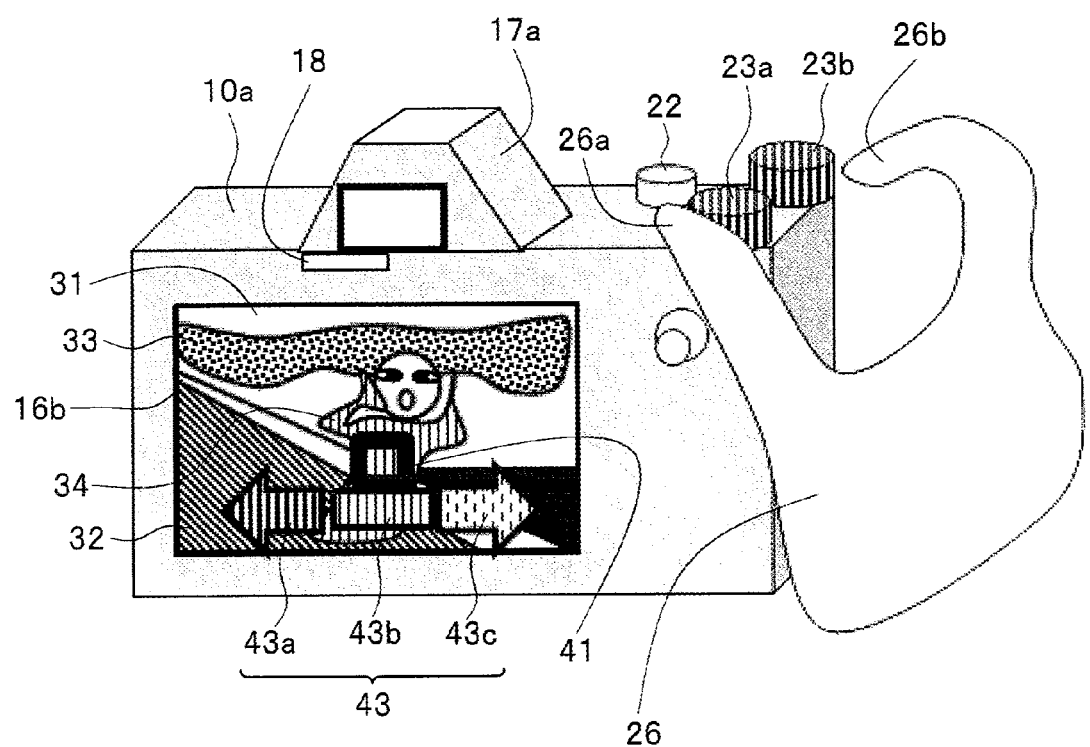
FIG. 8 is an illustration diagram for illustrating a screen display in a granular photographing mode.

FIG. 8 is an illustration diagram for illustrating the screen display in the granular photographing mode. FIG. 8 shows the state where an image 31 as a through image is displayed on the display screen 16b of the rear display section 16 disposed so as to cover substantially the entire region of the rear face of the housing 10a, based on the detection result from the eye sensor 18 arranged in the vicinity of the finder portion 17a of the photographing device 10. The image 31 includes an image 32 of relatively dark background, an image 33 of relatively bright background such as clouds, and an image 34 of a person.

In the present embodiment, the graininess effect indication 41 and the granularity adjusting indication 43 are superimposed on the image 31. Note that the graininess effect indication 41 is displayed in a bold frame indicating the graininess confirmation region. In the example shown in FIG. 8, the part of the image 34 of the person picked up at the exposure level at which visibility is excellent is set as the graininess confirmation region, and the image including the dots having the same size and density as those in the graininess confirmation region is shown as the graininess effect indication 41. In addition, the granularity adjusting indication 43 includes at the center thereof a graininess setting image 43b in which the graininess same as that in the graininess effect indication 41 can be obtained, and includes a coarse image 43a on the left side of the image 43b, and a fine image 43c on the right side of the image 43b. The coarse image 43a is displayed in the frame display of the left-pointing arrow, and the fine image 43c is displayed in the frame display of the right-pointing arrow.

The user can confirm, before the change of the setting, how the graininess is shown in the image of the graininess confirmation region when the user changes the setting of the granularity, by checking the granularity adjusting indication 43.

The user can change the graininess confirmation region set by the graininess confirmation region determination section 11e by the touching operation for designating a position in the image, for example. The image processing control unit 11 determines whether or not the touching operation has been performed in step S8. The touching operation is determined by the operation determination section 11b, and the graininess confirmation region determination section 11e sets the position on the image based on the touching operation (touch point) as the graininess confirmation region. In accordance with a newly set graininess confirmation region, the graininess effect indication generating section 11f generates the graininess effect indication and the graininess setting image, the coarse image, and the fine image. Thus, based on the updated graininess confirmation region, the graininess effect indication 41 and the granularity adjusting indication 43 are updated and displayed (step S11).

Figure 9:
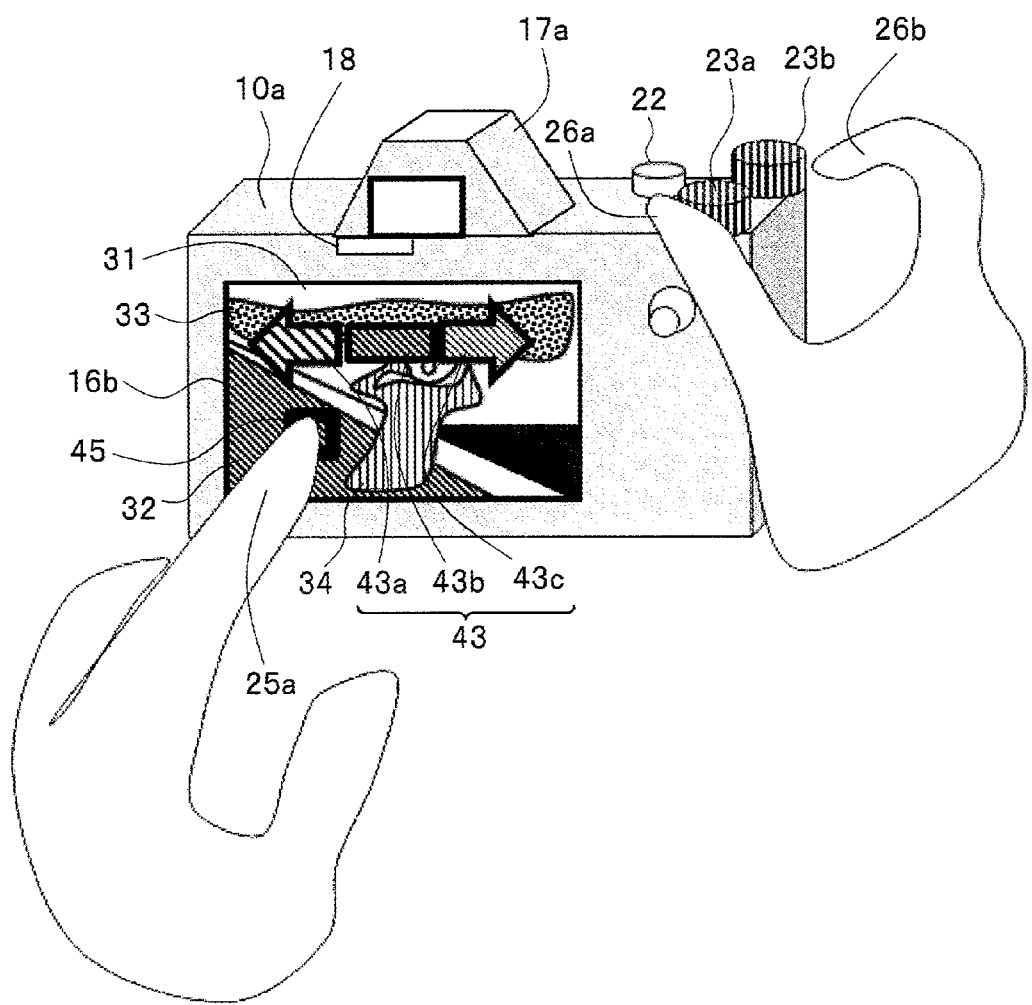
FIG. 9 is an illustration diagram showing a display example of a screen display.

FIG. 9 is an illustration diagram showing a display example of the screen display in the above-described case. When the user touches the display screen 16b with the left finger 25a, the touch point is set as the graininess confirmation region indicated by the frame display and a graininess effect indication 45 is displayed in the frame. In addition, on the image 31, also the granularity adjusting indication 43, which includes the graininess setting image 43b including graininess corresponding to that in the graininess confirmation region set based on the designation by the user, the coarse image 43a, and the fine image 43c, is newly displayed.

Furthermore, the user can correct the touch point, which is designated by the touching operation, with dial operation and the like. For example, when the user rotates the dial operation portion 23b with the index finger 26b of the right hand 26, the graininess confirmation region determination section 11e causes the processing procedure to move from step S9 to step S10, and moves the touch point in the screen vertical direction. Furthermore, when the user rotates the dial operation portion 23a with the thumb 26a, the graininess confirmation region determination section 11e moves the touch point in the screen horizontal direction. Thus, the graininess confirmation region can be moved, and in the step S11, the graininess effect indication 41 corresponding to the graininess in the corrected graininess confirmation region and the granularity adjusting indication 43 are displayed (step S11).

A graininess effect control section 11g determines, in step S12, whether or not the granularity adjusting operation has been performed by the user. For example, when the user performs operation for rotating the dial operation portion 23a with the thumb 26a of the right hand 26, the graininess effect control section 11g is capable of determining that the user has adjusted the granularity. For example, the graininess effect control section 11g may determine that the user has performed the granularity adjusting operation so as to obtain an image coarser than the present image, when the user moves the thumb 26a of the left hand to the left side to rotate the dial operation portion 23a in the clockwise direction, and may determine that the user performed granularity adjusting operation so as to obtain an image finer than the present image when the user moves the thumb 26a of the left hand to the right side to rotate the dial operation portion 23a in the counterclockwise direction.

When such granularity adjusting operation is performed, the graininess effect control section 11g controls the granularity setting section 11d to change the granularity in accordance with the user's operation (step S13). In addition, as described above, according to the above-described operation, the part where the graininess is changed may be determined in step S41 in FIG. 7, and in this case, the image before the operation may be compared with the image after the operation. This comparison is determined based on whether a pattern occurs at a specific frequency on the screen, for example. Thus, the image effect processing section 11c performs image effect processing on the picked-up image with the granularity corresponding to the user's setting.

Figure 10:
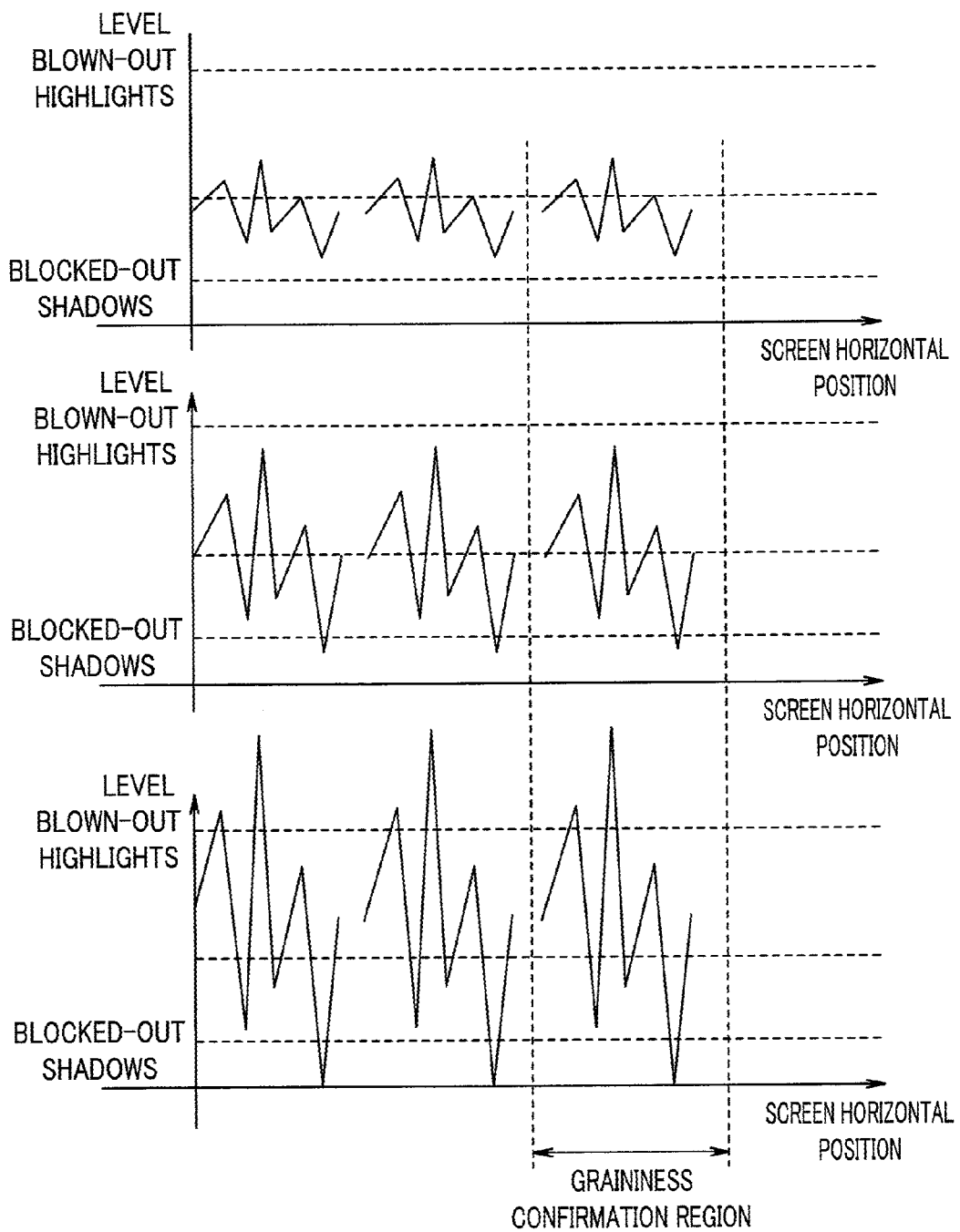
FIG. 10 is an illustration diagram showing granular noise corresponding to granularity adjusting operation.
Figure 11A:
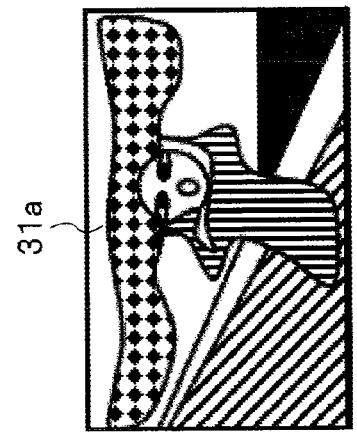
FIGS. 11A to 11C are illustration diagrams for illustrating an image in a case where granularity is changed in the granular photographing mode.
Figure 11B:
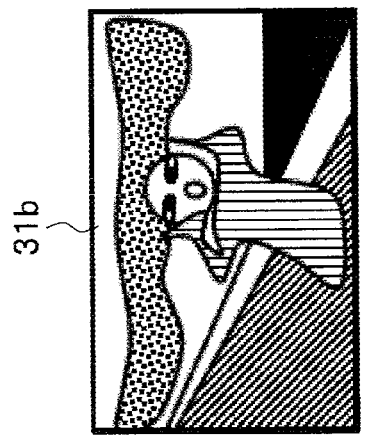
Figure 11C:
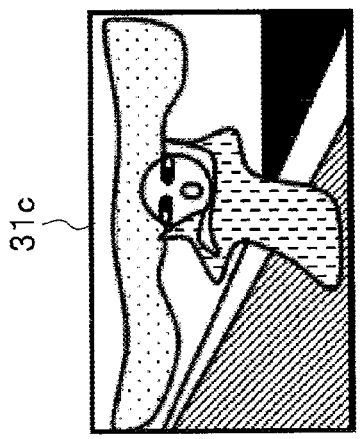

FIG. 10 is an illustration diagram showing one example of the granular noise corresponding to granularity adjusting operation. FIGS. 11A to 11C are illustration diagrams for illustrating an image in the case where the granularity is changed in the granular photographing mode. Note that FIGS. 11A to 11C indicate the change of the coarseness (graininess) of image quality with the types of the hatchings. The image 31a in FIG. 11A is the coarsest image, the image 31b in FIG. 11B is the second coarsest image, and the image 31c in FIG. 11C is the smoothest image. The upper section, the middle section, and the lower section in FIG. 10 correspond to FIG. 11C to FIG. 11A, respectively.

In the example in FIG. 10, the amplitude of the granular noise is changed in accordance with the granularity adjusting operation. The amplitude of the granular noise in the upper section in FIG. 10 is the smallest, the amplitude of the granular noise in the middle section in FIG. 10 is larger than the amplitude of the granular noise in the upper section in FIG. 10, and the amplitude of the granular noise in the lower section in FIG. 10 is the largest.

For example, in the case where the present through image after the image effect processing is the image 31b in FIG. 11B obtained by adding the granular noise in the middle section in FIG. 10, if the user rotates the dial operation portion 23a in the clockwise direction, the granular noise in the lower section in FIG. 10 is added and the through image is changed to the image 31a which is coarser than the present through image, and conversely, if the user rotates the dial operation portion 23a in the counterclockwise direction, the granular noise in the upper section in FIG. 10 is added and the through image is changed to the smooth image 31c.

When the image effect processing is changed by the granularity adjusting operation by the user, the graininess effect indication generating section 11f generates the graininess effect indication corresponding to the graininess in the graininess confirmation region, the graininess setting image, the coarse image, and the fine image. Thus, based on the graininess confirmation region in the updated picked-up image after the synthesis, the graininess effect indication 41 and the granularity adjusting indication 43 are updated and displayed (step S13).

The image processing control unit 11 determines, in step S14, whether or not the photographing operation has been performed. For example, when the user performs depression operation of the shutter button 22, the image processing control unit 11 determines that the photographing operation has been performed, to perform photographing and recording (step S15). Thus, the picked-up image on which the image effect processing has been performed by the image effect processing section 11c is recorded in the recording section 14.

Thus, in the present embodiment, for example, the region where the graininess is conspicuous, the region designated by the user, or the center of the screen, the region of interest at the AF point, or the like, is determined and set as the optimal region in the image for confirming the effect of graininess (graininess confirmation region), and the graininess effect indication that indicates the graininess in the graininess confirmation region is displayed. Therefore, even in the case where the picked-up image is displayed on a relatively small display screen, the effect to be obtained by imparting the graininess can be easily confirmed. In addition, the indication (granularity adjusting indication) that indicates the graininess of the image to be obtained when it is supposed that the setting of the image effect processing (granularity) has been changed is displayed, to thereby enable the effect of the change of the setting to be confirmed in advance. Furthermore, the direction in which the images each having different graininess are aligned in the granularity adjusting indication are made to correspond to the moving and displacing direction of the operation portion for adjusting the granularity, which enables the user to perform the granularity adjustment with more intuitive operation.

Modified Example

Figure 12:
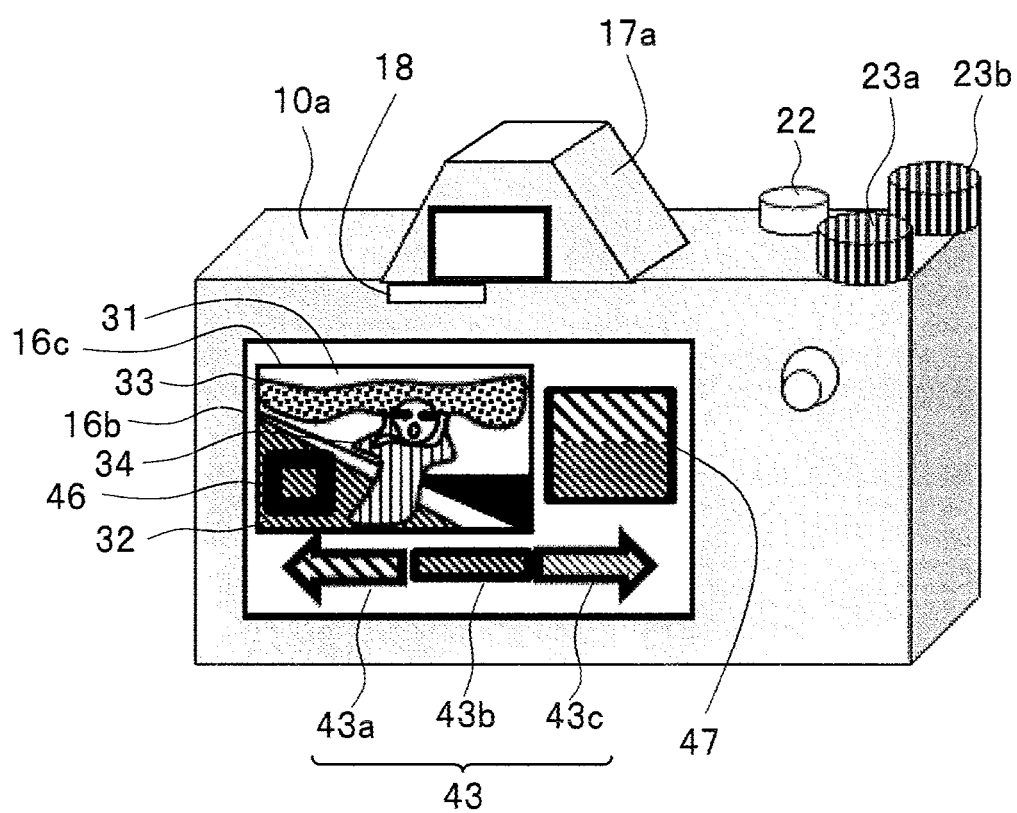
FIG. 12 is an illustration diagram showing a modified example.

FIG. 12 is an illustration diagram showing a modified example. In the modified example in FIG. 12, the graininess effect indication is displayed in a large size so as to provide sufficient visibility. In addition, in this case, in order to prevent poor visibility of the through image, the graininess effect indication and the granularity adjusting indication are displayed so as not to be superimposed on the through image in the modified example in FIG. 12.

As shown in FIG. 12, the display screen 16b includes thereon a through image display region 16c in which the picked-up image 31 as the through image is displayed, a region where a graininess effect indication 47 is displayed, and a region in which the granularity adjusting indication 43 is displayed. In addition, on the image 31, the frame display 46 indicating the present graininess confirmation region is displayed.

The graininess effect indication generating section 11f generates the graininess effect indication corresponding to the graininess in the graininess confirmation region shown with the frame display 46, and the graininess setting image, the coarse image, and the fine image. Thus, the graininess effect indication 47 and the granularity adjusting indication 43 are displayed on the display screen 16b.

Note that, in the example shown in FIG. 12, the graininess is changed in the graininess confirmation region. The graininess effect indication 47 shows the change of the graininess, and indicates the image in which the image quality on the upper side is coarser than that on the lower side.

Thus, also the present modified example can provide the same effects as those in the above-described embodiment, and has an advantage that the graininess effect indication and the granularity adjusting indication are easily viewable and confirmation of the graininess is easy.

Furthermore, in the embodiment of the present invention, description has been made by taking the digital camera as an example of the device for photographing. However, it is needless to say that the camera may be a digital single-lens reflex camera, a compact digital camera, a camera for moving picture such as a video camera and a movie camera, and also may be a camera built in a mobile information terminal (PDA: Personal Digital Assist) such as a mobile phone and a smartphone. Furthermore, the camera may be an industrial or medical optical device such as an endoscope or a microscope. In a case where a user selects a degree of adding the image processing in order to improve visibility, the present invention can be applied as a technique for rapidly determining that the strength of the image processing should be changed based on which reference point, and may be applied to the industrial or medical optical device such as an endoscope, a microscope, or the like. When applied to such devices, observation and diagnosis are important, and it is preferable to rapidly obtain an appropriate image for recording. In this case, the region used by an observer or a person who makes diagnosis when confirming the image effect may be prioritized and set as a confirmation region.

The present invention is not limited to the embodiment as it is, but can be embodied by modifying constituent elements in the practical stage within a range without departing from the gist of the invention. Furthermore, various inventions can be formed by appropriately combining the plurality of constituent elements disclosed in each of the embodiment. For example, among all of the constituent elements shown in the embodiments, some constituent elements may be removed.

Note that, in the claims, specification, and operation flows in the drawings, even if description is made by using the expressions "first", "next" and the like, for convenience sake, it does not mean that processing steps have to be executed in this order. In addition, needless to say, each of the steps constituting the operation flow may be appropriately omitted regarding the part which does not affect the essential part of the invention.

In addition, in the technique described above, many of the controls and functions described mainly in the flowcharts can be set by a program, and the above-described controls and functions can be executed by reading and executing the program by a computer. The entirety or a part of such a program can be recorded or stored as a computer program product in a portable medium such as a flexible disk, CD-ROM and a nonvolatile memory, or a storage medium such as a hard disk and a volatile memory, and can be distributed or provided at the time of product shipment or through a portable medium or telecommunications line. A user can easily realize the image effect processing support apparatus according to the present embodiment by downloading the program through a communication network to install the program into a computer, or by installing the program from a recording medium into a computer.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image effect processing support apparatus comprising:
    an image effect processing section that performs a specific image effect processing on an image;
    a confirmation region determination section that determines an effect of the specific image effect processing for each part of the image, and based on a result of the determination, determines and sets a confirmation region for confirming the effect of the specific image effect processing; and
    a display control section that displays an effect indication that shows the effect of the specific image effect processing in the confirmation region on a display section.

2. The image effect processing support apparatus according to claim 1, wherein
    the confirmation region determination section determines the confirmation region based on an image before the specific image effect processing, an image after the specific image effect processing, or the respective images before and after the specific image effect processing.

3. The image effect processing support apparatus according to claim 1, wherein the confirmation region determination section determines, as the confirmation region, a region where an exposure level is within a predetermined range in the image.

4. The image effect processing support apparatus according to claim 1, wherein the confirmation region determination section determines, as the confirmation region, a region where a contrast value is smaller than a predetermined threshold in the image before the specific image effect processing.

5. The image effect processing support apparatus according to claim 1, wherein the confirmation region determination section determines, as the confirmation region, a region where a number of contrast peaks is larger than a predetermined threshold in the image after the specific image effect processing.

6. The image effect processing support apparatus according to claim 1, wherein the confirmation region determination section determines, as the confirmation region, a region where a difference or a ratio of a number of contrast peaks is larger than a predetermined threshold in a same part in respective images before and after the specific image effect processing.

7. The image effect processing support apparatus according to claim 3, wherein the confirmation region determination section determines, as the confirmation region, a region having an area larger than a predetermined area.

8. The image effect processing support apparatus according to claim 4, wherein the confirmation region determination section determines, as the confirmation region, a region having an area larger than a predetermined area.

9. The image effect processing support apparatus according to claim 5, wherein the confirmation region determination section determines, as the confirmation region, a region having an area larger than a predetermined area.

10. The image effect processing support apparatus according to claim 6, wherein the confirmation region determination section determines, as the confirmation region, a region having an area larger than a predetermined area.

11. The image effect processing support apparatus according to claim 1, wherein the confirmation region determination section determines, as the confirmation region, a region at a center of a screen, an auto focus point, or a region designated by an operation performed by a user.

12. The image effect processing support apparatus according to claim 1, wherein the display control section displays the effect indication using an image portion having a same image quality as an image quality in the confirmation region.

13. The image effect processing support apparatus according to claim 1, wherein the display control section displays an adjustment indication for changing a setting of the specific image effect processing.

14. The image effect processing support apparatus according to claim 13, wherein the display control section displays the adjustment indication including an indication showing an image quality of an image portion, which is obtained when the setting of the specific image effect processing is changed.

15. The image effect processing support apparatus according to claim 13, further comprising an operation portion for instructing the change in the setting of the specific image effect processing by displacing a displacing member,
wherein the display control section displays the adjustment indication in which indications, which respectively show image qualities of a plurality of images obtained when a plurality of settings of the specific image effect processing are changed, are arranged in accordance with a displacing direction of the displacing member of the operation portion.

16. An image effect processing support method comprising:
an image effect processing step in which a specific image effect processing is performed on an image;
a confirmation region determining step in which an effect of the specific image effect processing is determined for each part of the image, and based on a result of the determination, a confirmation region for confirming the effect of the specific image effect processing is determined and set; and
a displaying step in which an effect indication that shows the effect of the specific image effect processing in the confirmation region is displayed on a display section.

17. A non-transitory computer-readable storage medium for recording an image effect processing support program for causing a computer to execute:
an image effect processing step in which a specific image effect processing is performed on an image;
a confirmation region determining step in which an effect of the specific image effect processing is determined for each part of the image, and based on a result of the determination, a confirmation region for confirming the effect of the specific image effect processing is determined and set; and
a displaying step in which an effect indication that shows the effect of the specific image effect processing in the confirmation region is displayed on a display section.

* * * * *